(12) United States Patent
Vaz

(10) Patent No.: US 11,009,005 B2
(45) Date of Patent: May 18, 2021

(54) TURBINE SYSTEM

(71) Applicant: Guy Andrew Vaz, Singapore (SG)

(72) Inventor: Guy Andrew Vaz, Singapore (SG)

( * ) Notice: Subject to any disclaimer, the term of this patent is extended or adjusted under 35 U.S.C. 154(b) by 4 days.

(21) Appl. No.: 16/329,377

(22) PCT Filed: Aug. 30, 2016

(86) PCT No.: PCT/SG2016/050422
§ 371 (c)(1),
(2) Date: Feb. 28, 2019

(87) PCT Pub. No.: WO2018/044228
PCT Pub. Date: Mar. 8, 2018

(65) Prior Publication Data
US 2019/0195194 A1 Jun. 27, 2019

(51) Int. Cl.
*F03D 3/04* (2006.01)
*F03D 3/06* (2006.01)

(52) U.S. Cl.
CPC ......... *F03D 3/0418* (2013.01); *F03D 3/0427* (2013.01); *F03D 3/062* (2013.01); *Y02E 10/72* (2013.01); *Y02E 10/74* (2013.01)

(58) Field of Classification Search
CPC .... F03D 1/0691; F03D 3/0418; F03D 3/0427; F03D 3/062
See application file for complete search history.

(56) References Cited

U.S. PATENT DOCUMENTS 9,309,865 B2 *   4/2016   Kelaiditis ............... F03D 3/062

FOREIGN PATENT DOCUMENTS

| DE | 3801673 | * | 3/1987 |
| FR | 2908840 | * | 5/2008 |
| WO | WO2009154594 | * | 12/2009 |
| WO | WO2012175078 | * | 12/2012 |

OTHER PUBLICATIONS

Machine translation for FR2908840 (Year: 2008).*
Machine translation for DE3801673 (Year: 1987).*
Machine translation for WO2012175078 (Year: 2012).*

* cited by examiner

*Primary Examiner* — David Hamaoui
*Assistant Examiner* — Brian O Peters
(74) *Attorney, Agent, or Firm* — Sinorica, LLC

(57) ABSTRACT

Disclosed herein is a turbine system comprising a support structure, a turbine assembly and a guide vane assembly. The support structure defines a central hollow and has an outer portion and an inner portion forming the periphery of the central hollow. The turbine assembly is movably coupled to and configured to be supported from the inner portion of the support structure to enable rotational displacement thereof along the periphery of the central hollow and about the first axis. The guide vane assembly is coupled to the outer portion of the support structure for circumscribing the support structure, the guide vane assembly comprising a plurality of guide vanes positionable for guiding fluids impinging thereupon towards the turbine assembly to thereby rotationally displace the turbine assembly about the first axis.

23 Claims, 18 Drawing Sheets

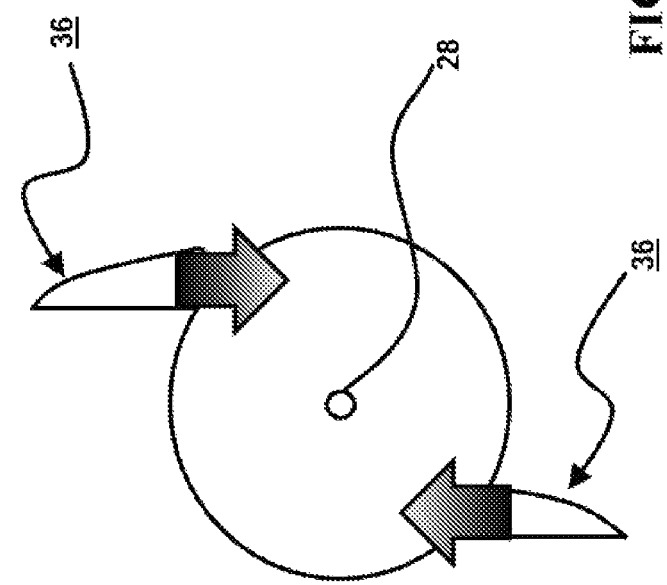
FIG. 18

Figure 1:
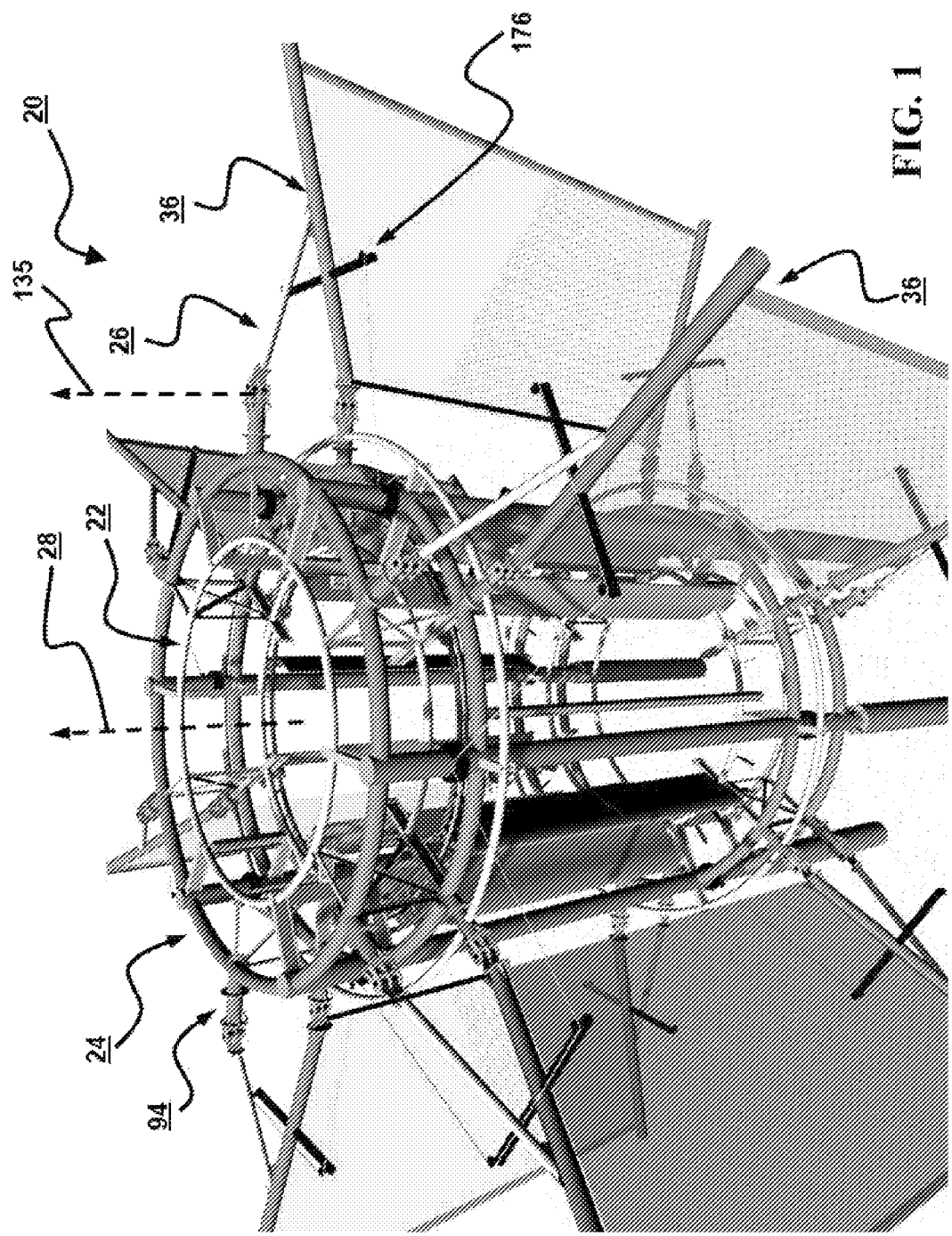
Figure 2:
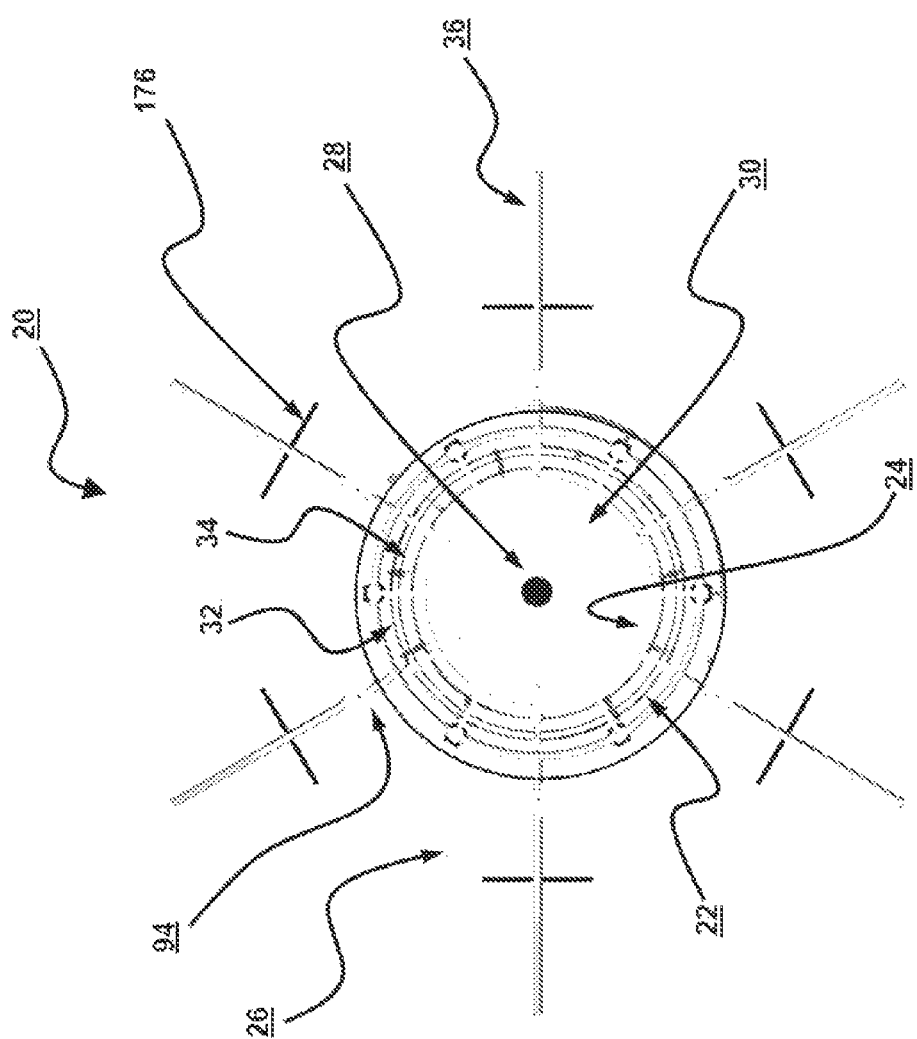
Figure 3:
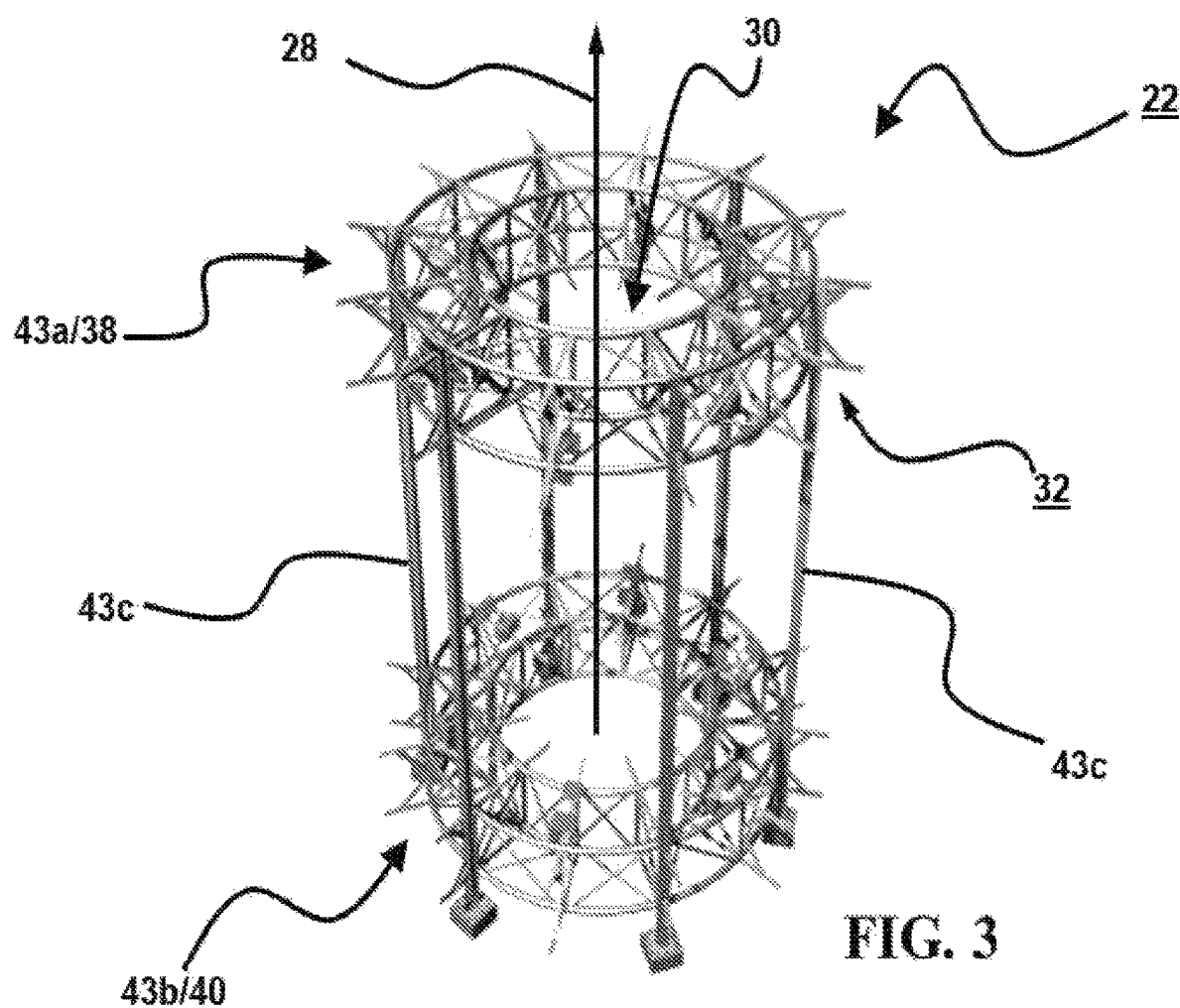
Figure 4:
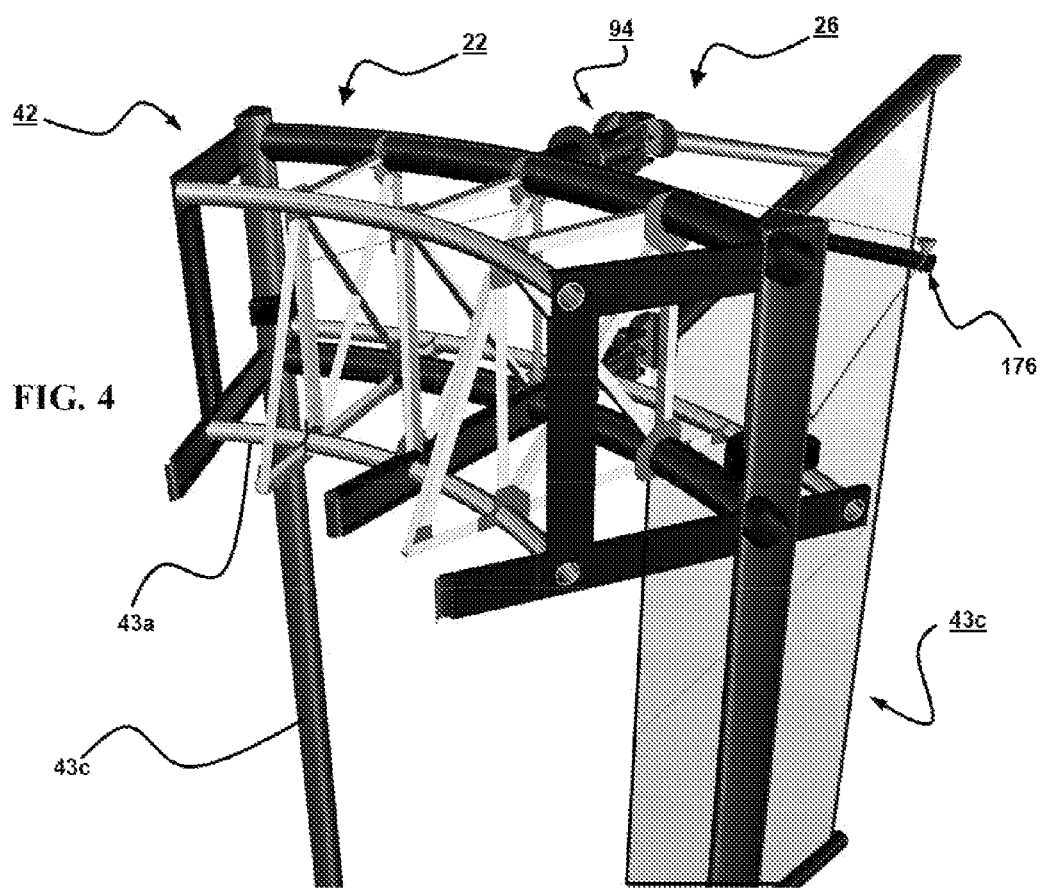
Figure 5:
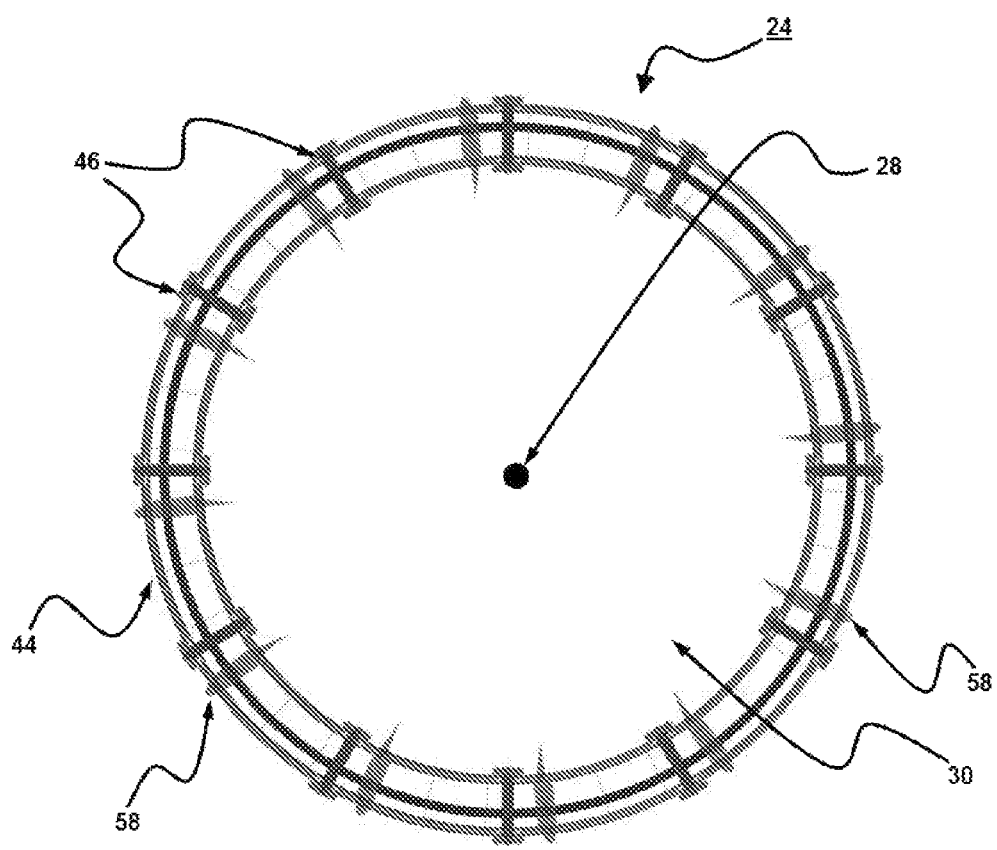
Figure 6:
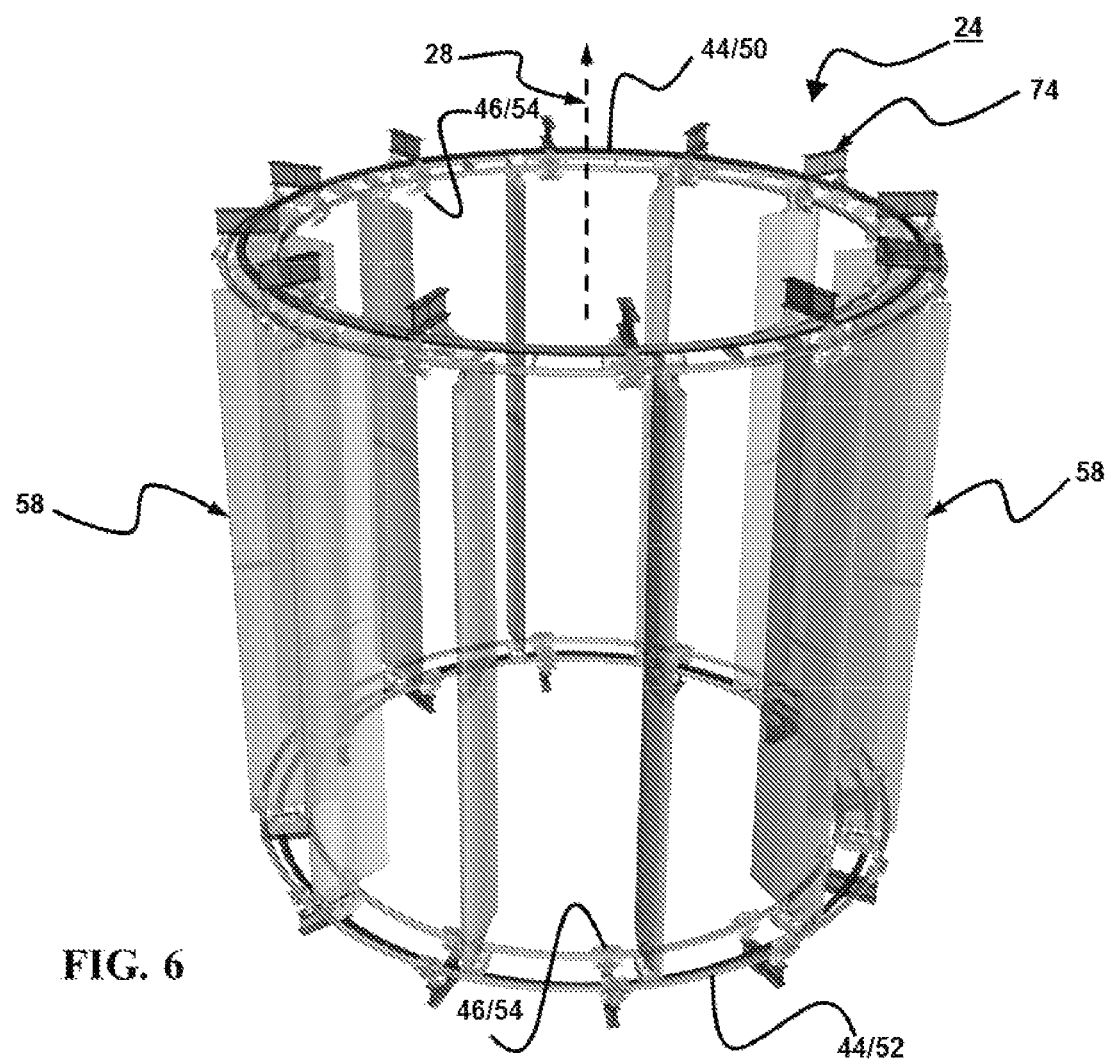
Figure 7:
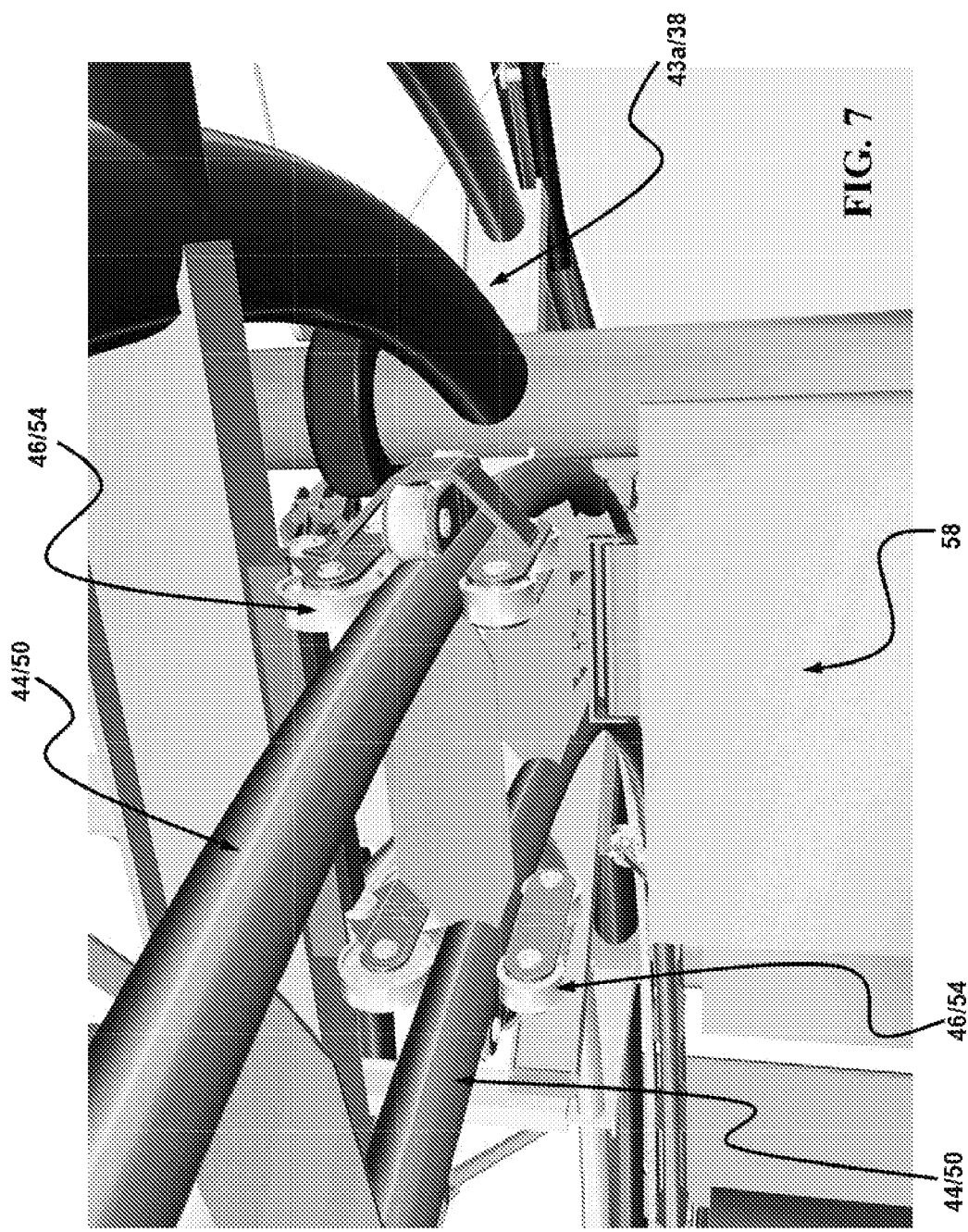
Figure 8:
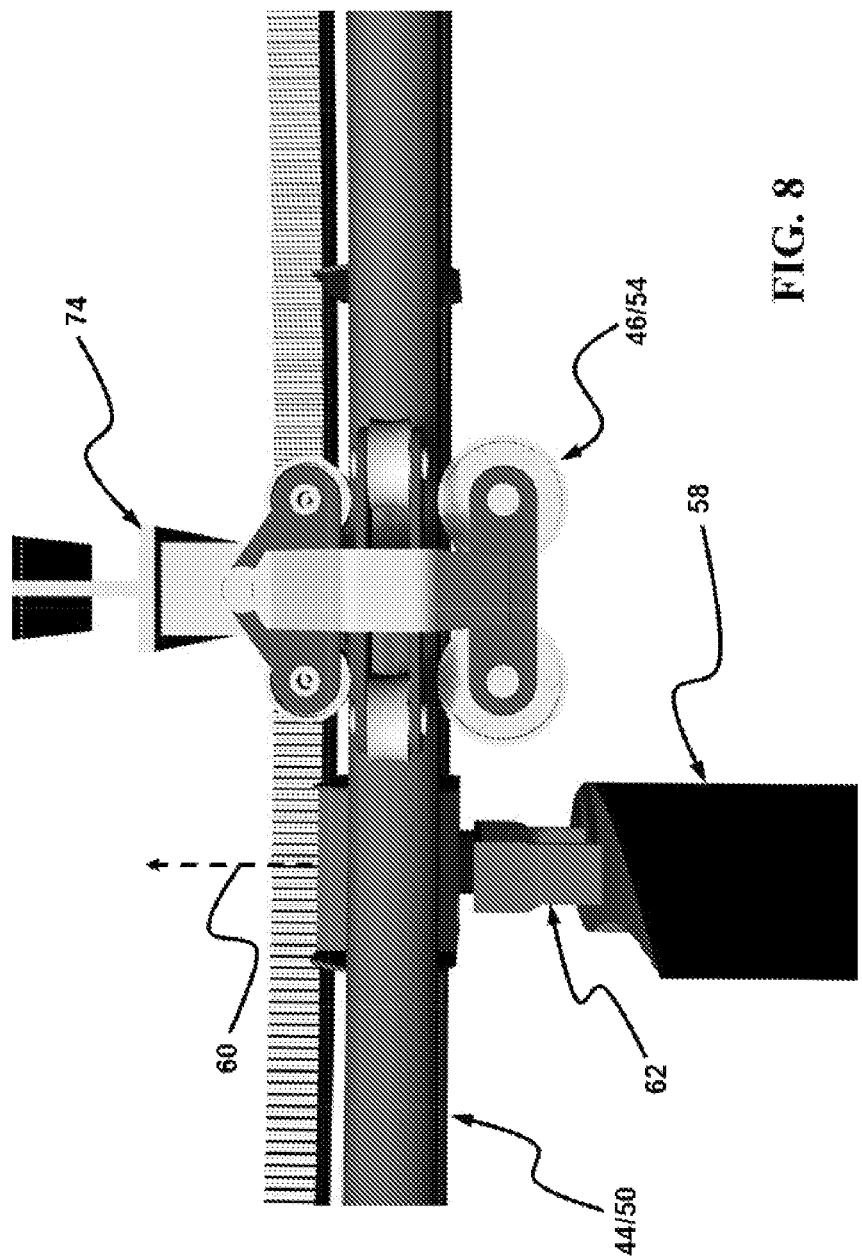
Figure 9:
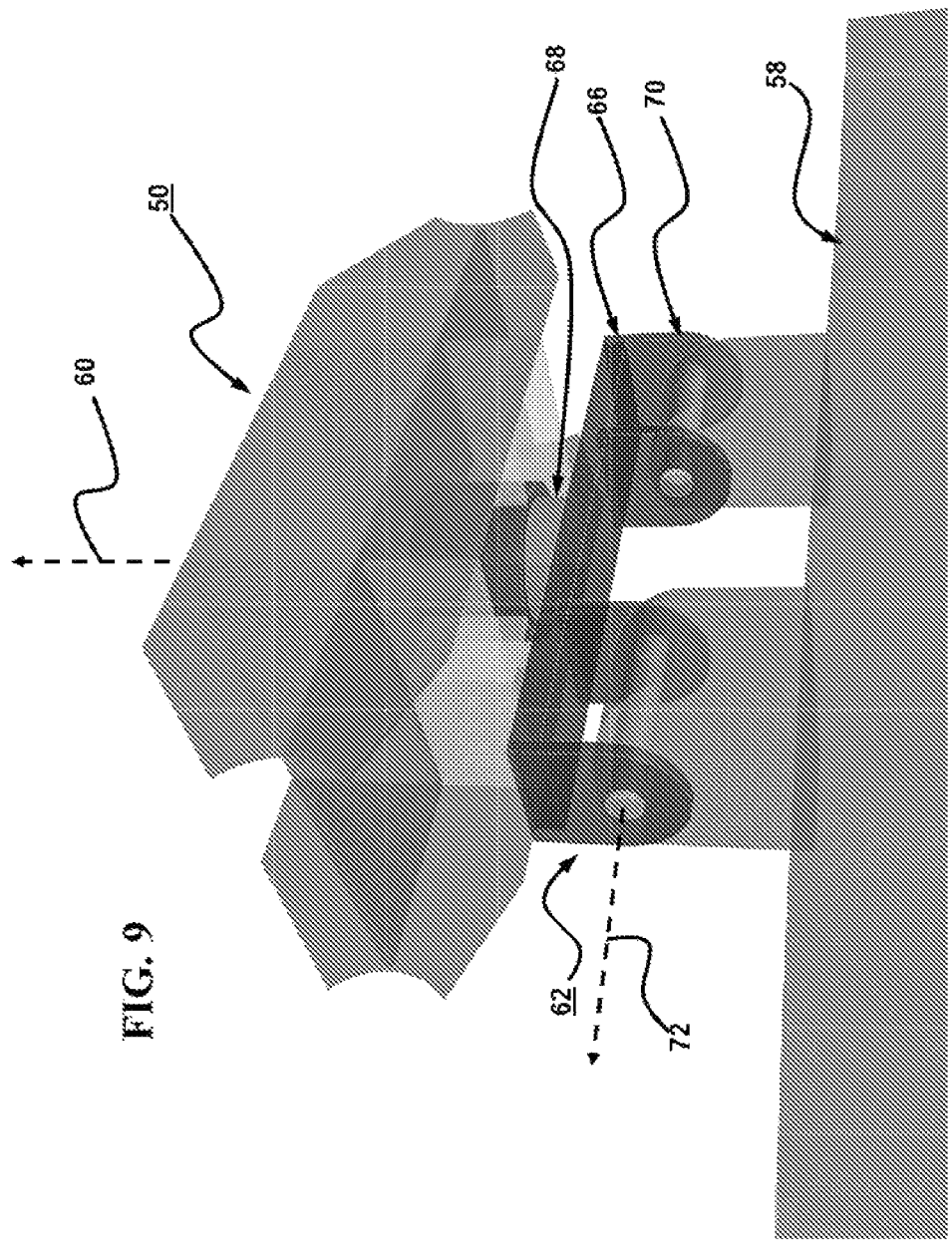
Figure 10:
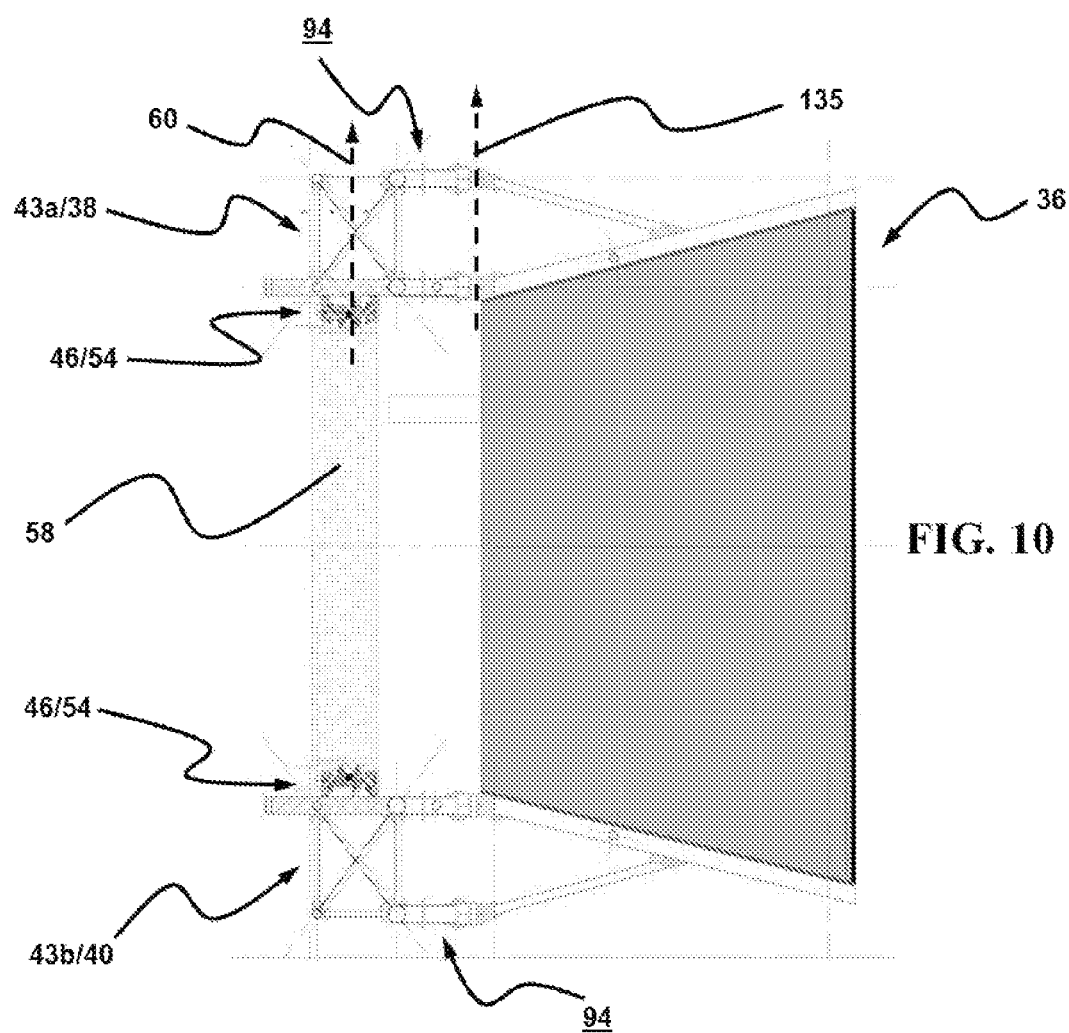
Figure 11:
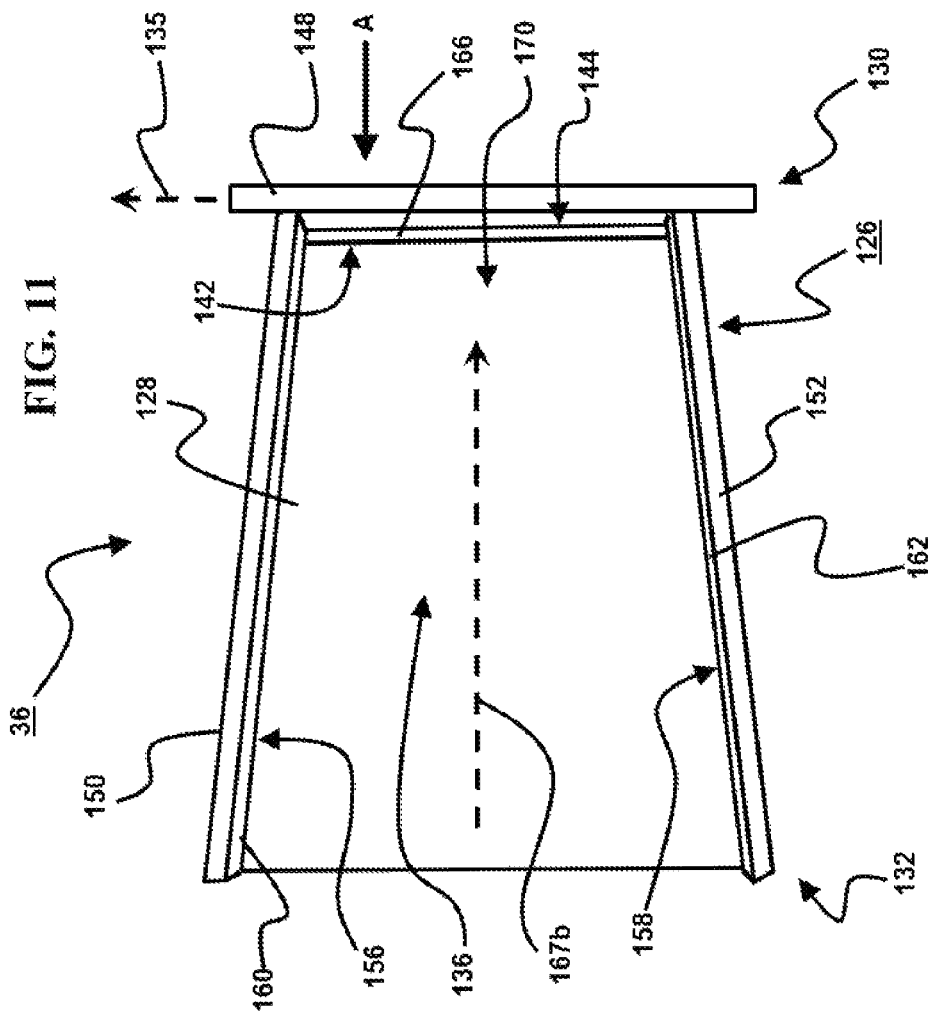
Figure 12:
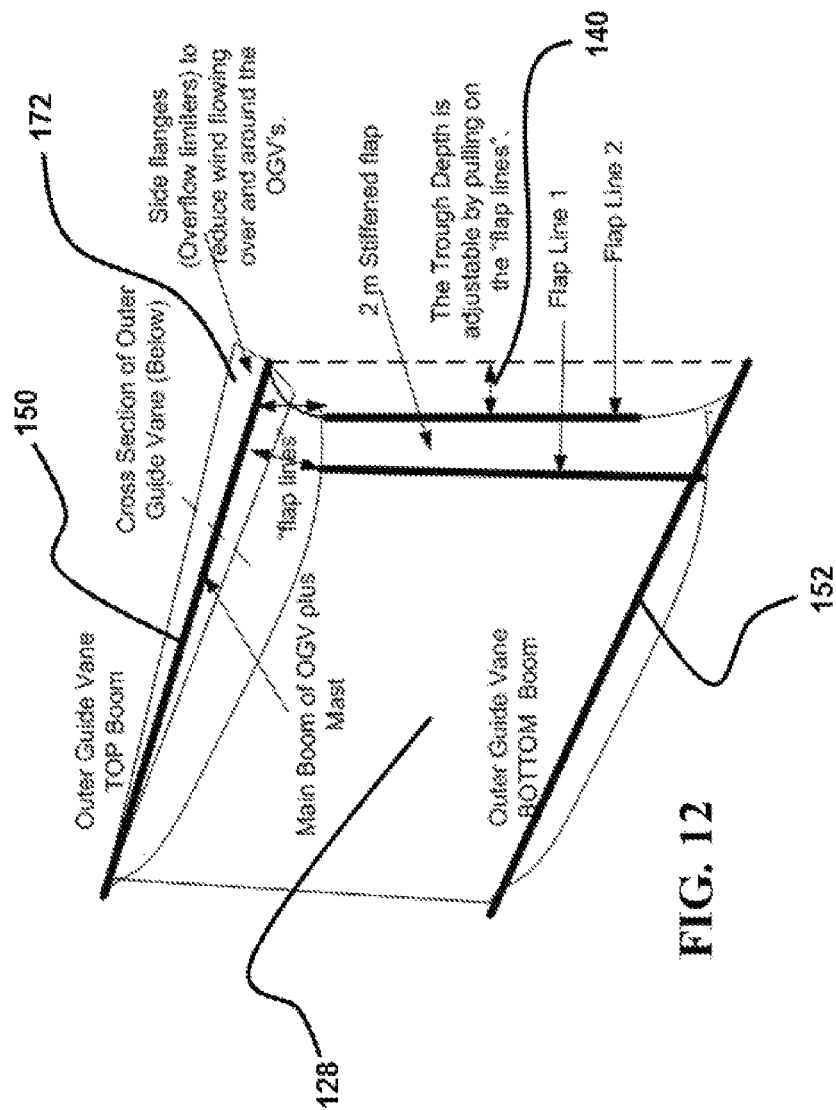
Figure 13:
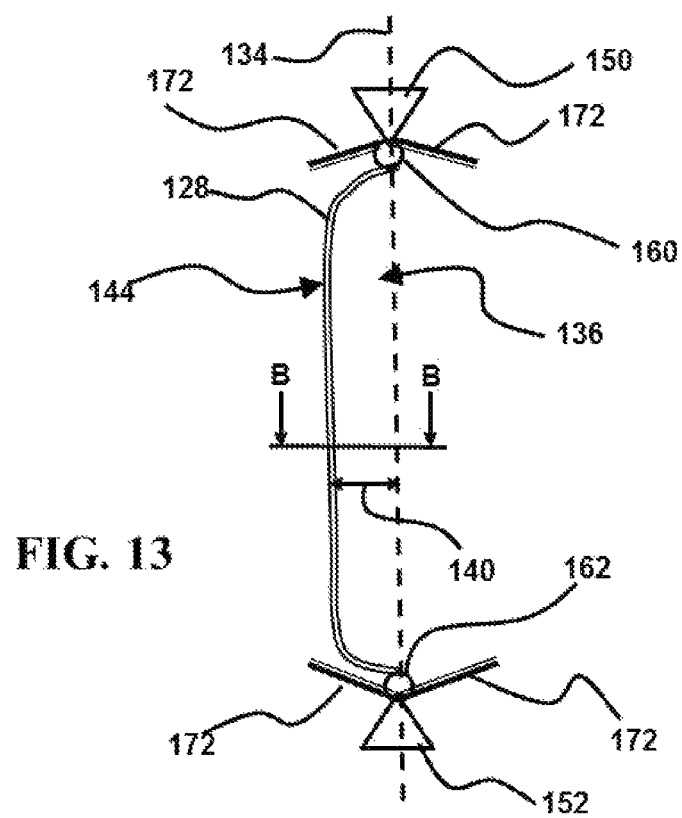
Figure 14:
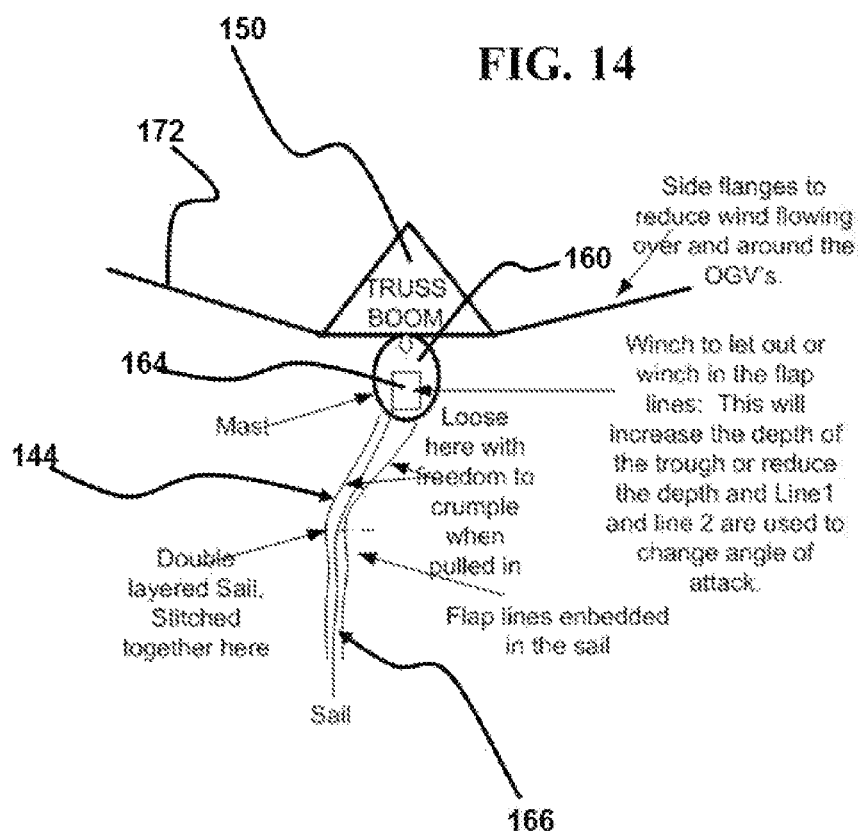
Figure 15:
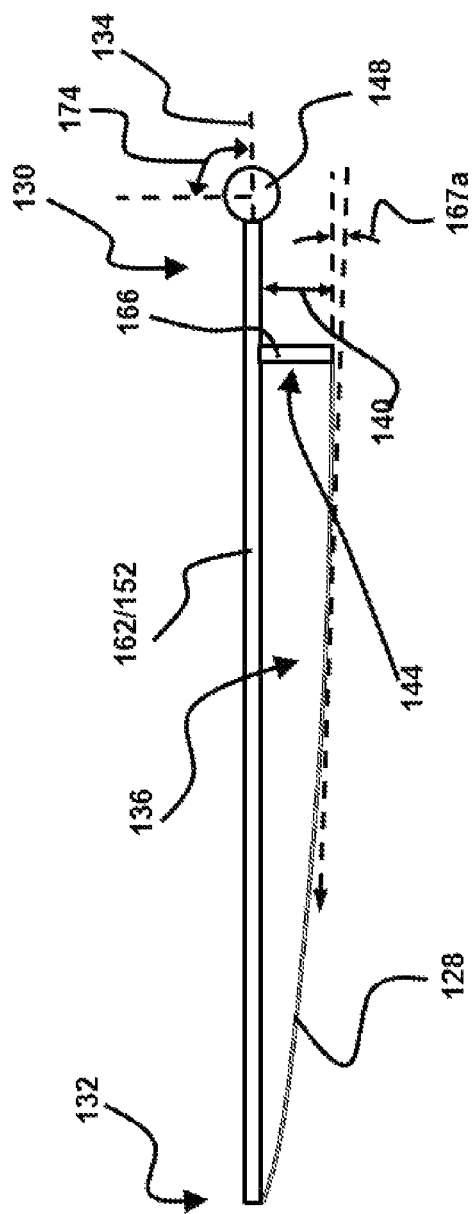
Figure 16:
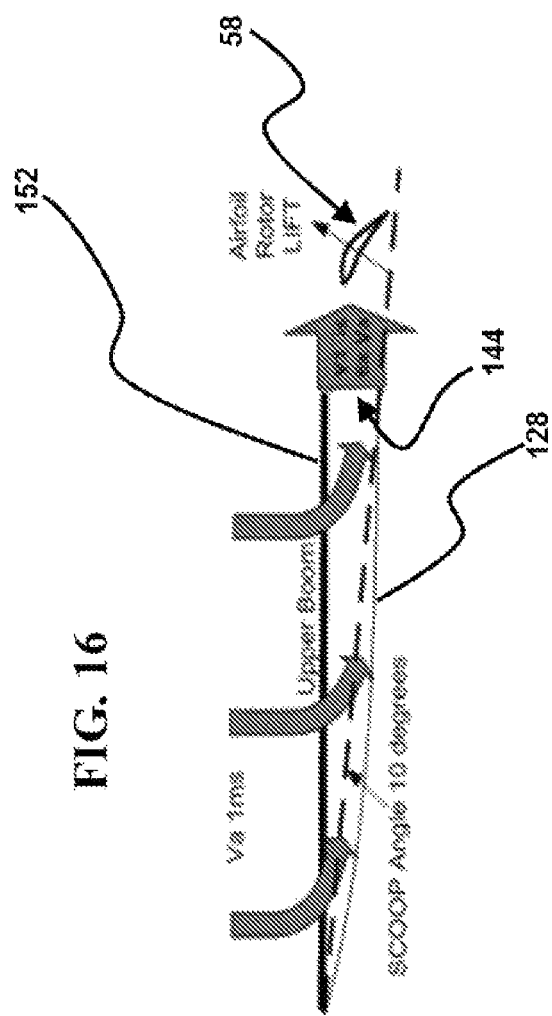
Figure 17:
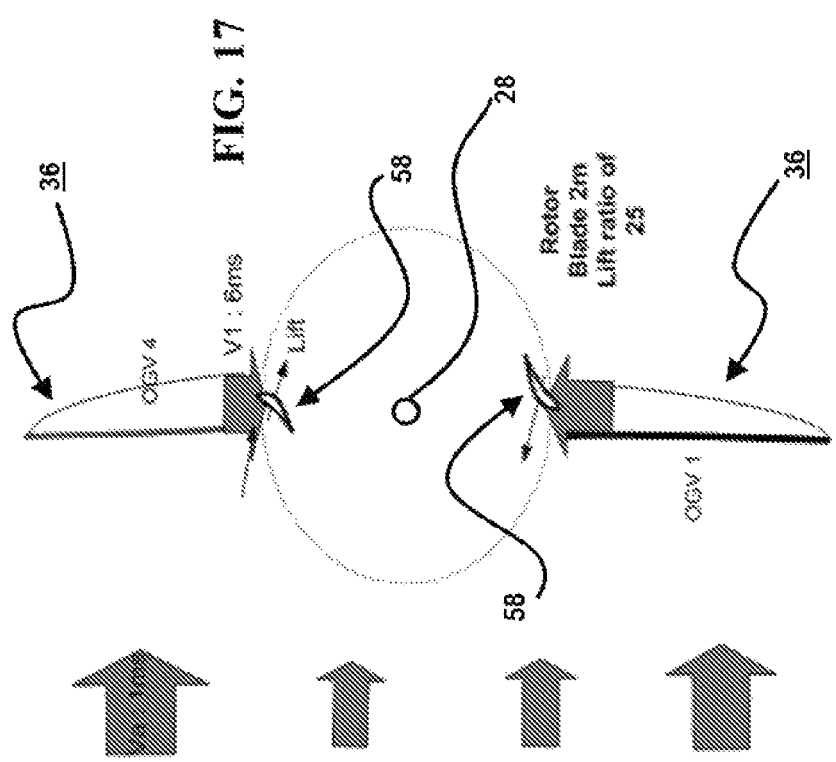

TURBINE SYSTEM
>
> ## TECHNICAL FIELD
>
> This invention relates generally to a turbine system for use for harvesting energy from fluid flow.
>
> ## BACKGROUND
>
> Wind energy has used for powering machinery since ancient times. Since then, the need to generate power from greener and renewable sources like the wind has become ever more urgent, and wind turbines have been developed for the production of electrical power. In spite of this, wind power has seldom succeeded in commercial terms, owing to the variability of the supply of wind over time and geography. Typically, wind turbines operating in areas with consistently high wind speeds tend to be the most commercially viable, but such sites are rare.
>
> Different wind turbine designs have been developed for use in different scenarios and applications. For example, they may be classified according to whether the blades of the wind vane rotate about an axis of a shaft which is horizontally or vertically disposed. Horizontal axis wind turbines (HAWTs) tend to be more commonly deployed as they tend to be more efficient: this is a result of blade rotation in a direction perpendicular to the direction of wind flow so that they receive energy through the entire cycle during rotation. However, they suffer various disadvantages, not least in the sheer height, size and weight of the towers and the blades, which makes installation, operation and maintenance extremely costly. They also need careful positioning into the wind, are unlikely to work well in conditions where the wind is variable in speed and direction. Such wind turbines are also potentially disruptive, in the visual sense as well as to anything from wildlife, to the transmissions of radio signals.
>
> Vertical axis wind turbines (VAWTs) are inherently less efficient as the blades receive energy from the wind for only a part of its rotation cycle during which it is "blown" forward. For much of the remaining part of the cycle, the blade rotates in a direction substantially against the direction of wind flow. There has been disclosure of use of guide vanes to better guide the wind flow to the blades to improve efficiency of the VAWTs. However, use of guide vanes with a planar surface often results on an amount of the wind impinging on the planar surface of the guide vanes being dispersed away from the intended direction of flow towards the blades. Therefore, there exists a need for a guide vane for addressing the foregoing problems.
>
> ## SUMMARY
>
> In accordance with an aspect of the invention, there is disclosed a turbine system comprising a support structure, a turbine assembly and a guide vane assembly. The support structure defines a first axis and a central hollow coinciding with the first axis and has an outer portion and an inner portion forming the periphery of the central hollow. The turbine assembly is movably coupled to and configured to be supported from the inner portion of the support structure to enable rotational displacement thereof along the periphery of the central hollow and about the first axis. The guide vane assembly is coupled to the outer portion of the support structure for circumscribing the support structure, the guide vane assembly comprising a plurality of guide vanes positionable for guiding fluids impinging thereupon towards the turbine assembly to thereby rotationally displace the turbine assembly about the first axis.
>
> ## BRIEF DESCRIPTION OF THE DRAWINGS
>
> FIG. 1 shows an exemplary partial perspective of a turbine system comprising a support structure, a turbine assembly and a guide vane assembly in accordance with an aspect of the invention;
>
> FIG. 2 shows a plan view of the turbine system of FIG. 1;
>
> FIG. 3 shows a partial perspective view of the support structure of FIG. 1;
>
> FIG. 4 shows a partial perspective view of a segment of the support structure of GIG. 3;
>
> FIG. 5 shows a plan view of the turbine assembly of FIG. 1;
>
> FIG. 6 shows a perspective view of the turbine assembly of FIG. 5;
>
> FIG. 7 shows a close up partial perspective view of inner rolling elements of the support structure of FIG. 3 configured with upper inner guide rails of the turbine assembly of FIG. 5;
>
> FIG. 8 shows a partial side elevation of the inner rolling elements configured with upper inner guide rails of FIG. 7;
>
> FIG. 9 shows a partial perspective view of an upper rotor joint configured for inter-coupling a rotor blade and the upper inner guide rails of the turbine assembly of FIG. 5;
>
> FIG. 10 shows a partial side view of a guide vane of the guide vane assembly of FIG. 1 coupled to the support structure of FIG. 3;
>
> FIG. 11 shows a partial side view of the guide vane of FIG. 10;
>
> FIG. 12 shows a partial perspective view of the guide vane assembly of FIG. 10;
>
> FIG. 13 shows a partial side sectional view of the guide vane assembly of FIG. 10 according to view A of FIG. 11;
>
> FIG. 14 shows a partial side sectional view of a sail coupled to a top boom of the guide vane of FIG. 11;
>
> FIG. 15 shows a partial plan view of the guide vane of FIG. 11 according to view B-B of FIG. 13;
>
> FIG. 16 shows a partial plan view of the guide vane of FIG. 11 according to view B-B of FIG. 13 with wind flow being redirected towards the rotor blade of the turbine assembly;
>
> FIG. 17 shows a plan view of two of the plurality of the guide vanes of FIG. 11 with illustration of wind being redirected to rotor blades of the turbine assembly; and
>
> FIG. 18 shows a plan view of two of the plurality of the guide vanes of FIG. 11 with illustration of wind being redirected to rotor blades of the turbine assembly in an exemplary variable orientation guide vane arrangement.
>
> ## DETAILED DESCRIPTION
>
> An exemplary embodiment of the present invention, a turbine system 20, is described hereinafter with reference to FIG. 1 to FIG. 18. The turbine system preferably comprises a support structure 22, a turbine assembly 24 and a guide vane assembly 26. Within the turbine system 20, the support structure 22 defines a first axis 28 and a central hollow 30 coinciding with the first axis 28. The support structure 22 has an outer portion 32 and an inner portion 34 forming the periphery of the central hollow 30. The turbine assembly 24 is movably coupled to and configured to be supported from the inner portion 34 of the support structure 22 to enable rotational displacement thereof along the periphery of the central hollow 30 and about the first axis 28.

Structurally, the turbine assembly 24 hangs from the inner portion 34 of the support structure 22. This structural configuration between the support structure 22 and the turbine assembly 24 is preferred as it enables the weight of the turbine assembly 24 to be distributed across the inner portion 34 of the support structure 22. This is opposed to having the turbine assembly 24 being supported from a central column or shaft (not shown) coinciding and parallel the first axis 28 and functioning as an axle to the turbine assembly 24 which will result in the full weight of the turbine assembly 24 being concentrated on the central column. Further, the cantilevering of the turbine assembly 24 from the central column may lead to weight and inertia eccentricity which may contribute to uneven or premature wear and tear when in use and failure contributed by static and dynamical imbalance of the turbine assembly 24 on such a central column.

The guide vane assembly 26 is coupled to the outer portion 32 of the support structure 22 to enable the guide vane assembly 26 to circumscribe the support structure 22. Further, the structural inter-configuration between the guide vane assembly 26, the turbine assembly 24 and the support structure 22 enables the weight of the guide vane assembly 26 to counteract the weight of the turbine assembly 24 and to reduce moment, at least in part, about the support structure 22.

The guide vane assembly 26 comprises a plurality of guide vanes 36 positionable for guiding fluids impinging thereupon towards the turbine assembly 24 to thereby rotationally displace the turbine assembly 24 about the first axis 28. The rotating turbine assembly 24 can then be harvested for energy, for example, through the use of alternators or the like energy transducing systems.

Support Structure

Preferably, each of the support structure 22 and the turbine assembly 24 has a tubular shape extending along the first axis between a first end 38 and a second end 40. This enables the turbine assembly 24 to be configured concentric the support structure 22. To facilitate construction and subsequent maintenance of the support structure 22, the support structure 22 is segregated into a plurality of segments 42 about the first axis 28 with each of the plurality of segments 42 extending between the first end 38 and the second end 40. Each of the plurality of segments 42 is structurally independent and preferably constructed to form a standalone truss structure module. Each of the plurality of segments 42 is preferably constructed from permanently inter-coupled channels, tubes, shafts, profiles or any combination thereof. The plurality of segments 42 are then inter-coupled, either permanently through, for example, welding, or removably through the use of, for example, joints and fasteners. For ease of transport, assembly and maintenance, it is preferred that the support structure 22 comprises and is formed from six of the plurality segments 42.

In an alternate implementation, the plurality of segments 42 may be encased or formed in concrete. Further alternatively, the support structure 22 is formed from concrete, for example pre-casted concrete or concrete segments, being steel-reinforced and pre-stressed to accommodate operational loading when in use.

When the plurality of segments 42 are inter-coupled and configured for use, the support structure comprises an upper annular structure 43a, a lower annular structure 43b and a plurality of pillars 43c extending between and inter-coupling the upper annular structure 43a and the lower annular structure 43b.

Again, it is preferred that at least one of the upper annular structure 43a, the lower annular structure 43b and the plurality of pillars 43c is being formed from truss structures for improved strength and rigidity.

Turbine Assembly

The turbine assembly 24 comprises a plurality of inner guide rails 44 with the support structure 22 comprising a plurality of inner rolling elements 46 for operationally complementing the plurality of inner guide rails 44. The plurality of inner rolling elements 46 are arranged to define a plurality of inner pathways, each corresponding with one of the plurality of inner guide rails 44. This enables the plurality of inner guide rails 44 to engage with the plurality of inner rolling elements 46 to thereby movably couple the turbine assembly 24 to the support structure 22 and to enable travel of each of the plurality of inner guide rails 44 along the corresponding one of the plurality of inner pathways.

The plurality of inner guide rails 44 are inter-coupled to form a rigid body. Preferably, each of the plurality of inner rolling elements 46 is one of a polymeric, an elastomeric and a metallic wheel being set with one of a bush and bearings on an axle coupled to the inner portion of the support structure 22. Further preferably, each of the plurality of inner rolling elements 46 comprises a hard wearing rubber or metallic layer, a ball or roller bearing assembly and an elastomeric layer interfacing the rubber layer and the bearing assembly. It is further preferred that the plurality of inner rolling elements 46 are arranged for substantially impeding movement of each of the plurality of inner guide rails 44 transverse the corresponding one of the plurality of inner pathways.

Each of the plurality of inner guide rails 44 is preferably formed from one or more longitudinal tube segments shaped to form an endless circular loop. In order to reduce play and torsional strain between the support structure 22 and the turbine assembly 24, the plurality of inner guide rails 44 are grouped into at least upper inner guide rails 50 and lower inner guide rails 52 and spatially displaced from one another.

The upper inner guide rails 50 comprises at least one of the plurality of inner guide rails 44 being disposed towards the first end 38 of the turbine assembly 24 and the lower inner guide rails 52 comprises at least one of the plurality of inner guide rails 44 being disposed towards the second end 40 of the turbine assembly 24. Additional groups of the plurality of inner guide rails 44 may be employed and disposed between the upper inner guide rails 50 and the lower inner guide rails 52.

Preferably, each of the plurality of inner pathways are substantially planar and is defined by multiple rolling element sets 54. Each of the rolling element set 54 comprises at least one of the plurality of inner rolling elements 46. Preferably, each of the upper inner guide rails 50 and the lower inner guide rails 52 has an end view cross-section comprising two spatially displaced circles formed by the inner guide rails 44 and a brace 56 extending between the circles. With the brace 56 being laid in a horizontal position, the cross-section will show a left circle and a right circle disposed at extremities of the brace 56. Each of the rolling element sets 54 will preferably have six rolling elements, three being positioned to abut the left circle at the 6, 9 and 12 o'clock positions while another three being positioned to abut the right circle at the 12, 3 and 6 o'clock positions. This configuration for each rolling element set 54 greatly reduces movement of each of the upper inner guide rails 50 and the lower inner guide rails 52 across the cross-sectional plane which is transverse the respective one of the plurality of inner pathways while still permitting displacement into the cross-sectional plane and along the plurality of inner pathways.

Preferably, a linear alternator is coupled to and configured to interpose the turbine assembly 24 and the support structure 22 with the linear alternator for generating power from relative displacement between the turbine assembly 24 and the support structure 22.

Rotor Blades

The turbine assembly 24 comprises a plurality of rotor blades 58 extending between the upper inner guide rails 50 and the lower inner guide rails 52. Each of the plurality of rotor blades 58 defines a rotor axis 60 along the length thereof. The rotor axis 60 of each of the plurality of rotor blades 58 is substantially parallel the first axis 28. Each of the plurality of rotor blades 58 is substantially rigid with sufficient strength to withstand flexure and torsion rated for the turbine system 20 without approaching plastic deformation.

Each of the plurality of rotor blades 58 is formed from a single structural piece. Alternatively, each of the plurality of rotor blades 58 is formed from multiple inter-coupled structural segments. Each of the plurality of rotor blades being rotatably coupled to the upper inner guide rails 50 and the lower inner guide rails 52 to enable rotational displacement of each of the plurality of rotor blades about the rotor axis thereof.

For each of the plurality of rotor blades 58, an upper rotor joint 62 couples one end of the rotor blade 58 to the upper inner guide rails 50 while a lower rotor joint couples the other end of the rotor blade 58 to the lower inner guide rails 52. Each of the upper rotor joint 62 and the lower rotor joint comprises a joint body 66, a spindle 68 extending from the joint body 66 and a pair of hinges 70 extending from the joint body 66 away from the spindle 68. The spindle 68 is shaped and dimensioned to couple to the respective one of the upper inner guide rails 50 and the lower inner guide rails 52 and is orientated to enable rotational displacement of the respective one of the plurality of rotor blades 58 about the rotor axis 60 thereof. The pair of hinges 70 couples with the respective ends of each of the plurality of rotor blades 58 to enable rotational displacement about a hinge axis 72 defined by the pair of hinges 70 which in turn translates into accommodation of flexure of the respective one of the plurality of rotor blades 58. The tethering of each of the plurality of rotor blades 58 between the respective upper rotor joint 62 and the lower rotor joint also enables the use and accommodation of the rotor blades 58 with a multi-segment/multi-jointed construction.

Each of the upper inner guide rails 50 and the lower inner guide rails 52 can comprise a support bar 74 formed from, for example, an I-beam channel or a U-beam channel for coupling of the spindle 68 of the respective one of the upper rotor joint 62 and the lower rotor joint thereto.

The turbine system 20 further comprises a plurality of rotor actuators in signal communication with a controller for controlling operation thereof. Each of the plurality of rotor actuators in operational engagement with one of the lower inner guide rails 52 and the upper inner guide rails 50 and a corresponding one of the plurality of rotor blades 58 for angularly positioning the corresponding one of the plurality of rotor blades 58 about the rotor axis 60 thereof.

Guide Vane Assembly

The guide vane assembly 26 comprises a plurality of outer guide rails while the support structure 22 comprises a plurality of outer rolling elements arranged to define a plurality of outer pathways, each corresponding with and for the passage therealong of one of the plurality of outer guide rails. When in use, the plurality of outer guide rails engages with the plurality of outer rolling elements to thereby movably couple the guide vane assembly 26 to the support structure 22 and enable travel of each of the plurality of outer guide rails along the corresponding one of the plurality of outer pathways.

The plurality of outer guide rails are inter-coupled to form a rigid body. Preferably, each of the plurality of outer rolling elements is one of a polymeric, an elastomeric and a metallic wheel being set with one of a bush and bearings on an axle coupled to the inner portion of the support structure 22. Further preferably, each of the plurality of outer rolling elements comprises a hard wearing rubber or metallic layer, a ball or roller bearing assembly and an elastomeric layer interfacing the rubber layer and the bearing assembly. It is further preferred that the plurality of outer rolling elements are arranged for substantially impeding movement of each of the plurality of outer guide rails transverse the corresponding one of the plurality of outer pathways.

Each of the plurality of outer guide rails is preferably formed from one or more longitudinal tube segments shaped to form an endless circular loop. In order to reduce play and torsional strain between the support structure 22 and the guide vane assembly 26, the plurality of outer guide rails are grouped into at least upper outer guide rails and lower outer guide rails and spatially displaced from one another. The upper outer guide rails comprises at least one of the plurality of outer guide rails being disposed towards the first end 38 of the support structure 22 while the lower outer guide rails comprises at least one of the plurality of inner guide rails being disposed towards the second end 40 of the support structure 22. Additional groups of the plurality of outer guide rails may be employed and disposed between the upper outer guide rails and the lower outer guide rails.

The guide vane assembly 26 comprises an outer actuator and an outer rack extending along an arcuate adjacent one of the upper outer guide rails and the lower outer guide rails. The outer rack is engageable with an outer actuator-driven one of a pinion, bevel and a worm gear to thereby enable control by the outer actuator for angular positioning of the guide vane assembly 26 about the first axis 28. Alternatively, an outer actuator-driven linear displacement stage may be employed for angular positioning of the guide vane assembly 26 about the first axis 28.

The guide vane assembly 26 further comprises an outer frame 94 inter-coupling the plurality of outer guide rails and spatially displacing the upper outer guide rails from the lower outer guide rails. The outer frame 94 is preferably formed from multiple inter-coupled structural segments configured for inwardly fencing at least a portion of the outer structure. The plurality of guide vanes 26 are rotatably coupled to the outer frame 94 and spatially distributed about the first axis 28.

Guide Vane Rig Structure

Each of the plurality of guide vanes 36 comprises a rig structure 126, configurable with the turbine assembly 24, and a sail 128. The rig structure 26 has an inner portion 130 and an outer portion 132 forming extremities thereof. The inner portion 130 of the rig structure 126 is positioned nearer to the turbine assembly 24 than the outer portion 132 thereof. The rig structure 126 defines a rig plane 134 and a vane axis 135. The angle that the rig plane 134 establishes with the turbine assembly 24 is variable about the vane axis 135. The sail 128 is coupled to the rig structure 126 and is shaped for presenting a trough 136 to a flow of impinging fluid. The impinging fluid can be one or a combination of wind, water or any type of liquids.

The sail 128 is formed from a flexible material for enabling displacement of the trough 136 across the rig plane 134 by the impinging fluid. The trough 136 has a depth 140 defined from the rig plane 134. The sail 128 extends from the outer portion 132 towards the inner portion 130 of the rig structure 126 to terminate at an inner edge 142 whereat a vent 144 is defined. The fluid impinging on the sail 128 is concentrated at the trough 136 and redirected towards the turbine assembly 24 from the vent 144. Each of the plurality of guide vanes 36 further comprises an actuator assembly coupled to the rig structure 126 and whereto a portion of the sail 122 at the vent 144 is anchored.

The rig structure 126 comprises a post 148 configured at the inner portion 130 of the rig structure 126 and a pair of booms, specifically a first boom 150 and a second boom 152, extending from the post 148. The post 148 has an upright and a substantially vertical orientation and is preferably coupled, at least at one end thereof, to the outer frame 94. The first boom 150 and the second boom 152 are spaced apart along the post 148 with each thereof extending substantially perpendicular the post 148 towards the outer portion 132 of the rig structure 126. It is preferred that each of the first boom 150 and the second boom 152 are angled away from each other with each thereof being supported by support lines extending between the post 148 and each of the first boom 150 and the second boom 152.

Each of the post 148, the first boom 150 and the second boom 152 are preferably formed from truss structures. However, use of other types of elongated structures with a solid core, a hollow core or a frame-based construction are not precluded from being use in forming or constructing the post 148, the first boom 150 and the second boom 152. For example, each of the first boom 150 and the second boom 152 are formed from truss structures with a triangular cross-sectional shape, with a corner of the triangular cross-section of the truss structure of one of the first boom 150 and the second boom 152 inwardly pointed towards a corner of the triangular cross-section of the truss structure of the other of the first boom 150 and the second boom 152. For larger-scale implementation of the turbine system 20, each of the first boom 150 and the second boom 152 may instead be formed from tubular shafts without adopting the aforesaid truss structure configuration.

The sail 128 has an upper edge 156 and a lower edge 158 coupled respectively to the first boom 150 and the second boom 152. The sail 128 can be directly coupled to the first boom 150 and the second boom 152. Alternatively, the rig structure 126 further comprises a first mast 160 coupled to the first boom 150 whereto the upper edge 156 of the sail 28 slidably couples, and a second mast 162 whereto the lower edge 158 of the sail 128 slidably couples. This enables the sail 128 to be collapsible from an extended state towards the outer portion 132 of the rig structure 126 to a retracted state. Preferably, each of the first boom 150 and the second boom 152 is constructed to allow flexure. Hence, as an alternative to truss structures, the first boom 150 and the second boom 152 are constructable from metal H/I beams, composite elongates or the like structures to enable the first mast 160 and the second mast 162 to swing.

Each of the upper mast 160 and the lower mast 162 can comprise and employ a pulley-line assembly to control deployment of the sail 128 between the extended state and the collapsed state. The pulley-line assemblies can be coupled to independent upper and lower cranks or to a common crank operable for communicating motion to the respective pulley line assembly. The crank can be hand-operated or coupled to a motor for operation thereof.

The rig structure 126 further comprises a sheath formed along the outer portion 132 thereof for receiving the sail 128 when crumpled towards the outer portion 132 of the rig structure 126 and thereinto. The sheath being shaped and dimensioned for shielding the crumpled sail 128 received therein from fluids directed thereat. The sail 128 is formed from a flexible material, for example, fabric, denim, polymeric, cellulosic, metallic mesh or any combination thereof. When the sail 128 is in the extended state, the depth 140 of the trough 136 increases the nearer it gets to the inner portion 130 of the rig structure 126.

The actuator assembly comprises a winch 164 and a control line 166 whereto the inner edge 142 of the sail 128 is coupled. The winch 164 is for one of taking and releasing slack in the control line 166 to thereby displace the inner edge 142 of the sail 128 one of towards and away from the rig plane 134. The control line 166 can be a braided cable, a tape, a composite cable or the like lines with high tensile strength. The control of the trough depth 140 at the vent 144 not only controls the cross-sectional area of the vent 144, but also serves to vary the deployable volume of the trough 136 and a exhaust angle 167$a$ of the sail 128 along a medial axis 167$b$ extending substantially perpendicular the inner edge 142 of the sail 128 with reference to the rig plane 134.

The rig structure 126 further comprises a plurality of stiffeners formed with the sail 128 for shaping the trough 140. Each of the plurality of stiffeners is elongated and spatially inter-displaced along a medial segment 170 of the sail 128 from the outer portion 132 towards the inner portion 130 of the rig structure 126 with each of the plurality of stiffeners extending between the outer portion 132 and the inner portion 130 of the rig structure 126. Each of the plurality of stiffeners are shaped and formed to be resiliently biased to accommodate and impart flexure to the medial segment 170 of the sail 128. Further, the plurality of stiffeners are being disposed for defining folding lines parallel thereto to enable the sail 128 to be substantially kinked along the folding lines when presented to fluids impinging thereupon to thereby further shape the trough 140 of the sail 128.

Each of the first mast 160 and the second mast 162 comprises a pair of flanges 172 outwardly extending from the respective one of the first mast 160 and the second mast 162 over a portion of the sail 128 oblique the rig plane 134. The pair of flanges 172 at each of the first mast 160 and the second mast 162 is to reduce escape of fluid from the trough 136 theretowards.

The first boom 150 and the second boom 152 are rotatably coupled with the post 148 to the outer frame 94 to enable varying of vane angle 174 of the rig plane 34 about the vane axis 135 with reference to the turbine assembly 24. The vane axis 135 is defined substantially adjacent or coincident the length of the post 148. Specifically, the vane angle 174 is referenced from the tangent of a reference circle circumscribing the periphery of the turbine assembly 24. The rig structure 126 comprises a pair of cross bars 176, an actuator, for example a linear motor and a rotary motor, and a coupling assembly for communicating displacement to the first boom 150 and the second boom 152 about the vane axis 135. Each of the cross bars 176 is configured to be positioned substantially perpendicular one of the pair of booms with exteremities thereof being coupled to the actuator via the coupling assembly for controlling angular positioning of the pair of booms about the vane axis 135 by the actuator.

The coupling assembly is at least one of a pulley assembly, a translational linkage and a plurality of gears interposing the actuator and the first boom 150 and the second boom 152 via the pair of cross bars 176. The cross bars 176 are also dimensioned and positioned for the extremities of each thereof to abut the outer frame 94, or an abutment surface on the outer frame 94, to limit the angular displacement of the rig structure 126 about the vane axis 135 which in turn will prevent collision between adjacent guide vanes 36 when in use.

Inner Vane Assembly

The turbine system 20 can further comprises an inner vane assembly. The inner vane assembly an inner cage and a plurality of inner vanes coupled to the inner cage. The inner cage is preferably cylindrically-shaped and defines an upper end and a lower end. The inner cage is preferably formed from one or a combination of metallic shafts, tubes and profile structures. The inner cage is formed concentric the support structure 22 and the turbine assembly 24. The inner vane assembly is configured and positioned for disposing the turbine assembly 24 between the support structure 22 and the inner vane assembly. Each of the plurality of inner vanes comprises an upper joint rotatably coupled to the upper end of the inner cage, and a lower joint rotatably coupled to the lower end of the inner cage. Each of the plurality of inner vanes further comprises a pair of cable, for example braided steel cables, extending between the upper joint and the lower joint, and an inner sail formed from a flexible material and extending between the pair of cable.

The inner vane assembly further comprises a plurality of inner actuators disposed at both the upper end and the lower end of the inner cage and being in operational engagement with the upper joint and the lower joint. Each of the upper joint has one of the plurality of inner actuators in engagement therewith while each of the lower joint also has one of the plurality of inner actuators in engagement therewith. The plurality of inner actuators are in signal communication with the controller to enable control thereby. This enables each of the inner vanes, specifically the upper joint and the lower joint, to be independently controller via the respective pairs of inner actuators to thereby vary the angle of each of the inner vanes about an axis that is substantially parallel the first axis 28. The inner vanes are to deflect, redirect or further shape air that has passaged through the turbine assembly 24 from the guide vane assembly 26.

Each of the plurality of inner actuators may be paired with a feedback angular encoder in signal communication with the controller to effect accuracy in displacement synchronization and angular positing between each pair of the upper joint and the lower joint.

Fixed Orientation Guide Vane Arrangement

In one implementation where the guide vane assembly 26 is not rotationally displaceable about the first axis 28 relative the support structure 22, the guide vane assembly 26 can comprise six to eight of the guide vanes 36 arranged, preferably, at equal angular spacing about the first axis 28. Based on the direction of the incoming wind, each of the plurality of guide vanes 36 may serve to guide and shape air received at the windward side of the turbine for exhausting to the plurality of turbine assembly 24 for displacement thereof.

Each of the plurality of rotor blades 58 is rotatable about its rotor axis 60 for presenting the best blade orientation to the air exhausted from the windward projecting guide vanes 36. On the leeward side of the turbine system 20, the leeward projecting guide vanes 36 function to guide the air exiting the turbine assembly 24 away therefrom to reduce impinging turbulence on the rotor blades 58.

In an exemplary configuration utilizing six of the guide vanes 36, the guide vanes 36 outwardly extends from the outer frame 94 at the 12 o'clock, 2 o'clock, 4 o'clock, 6 o'clock, 8 o'clock and 10 o'clock clock angular reference points on the guide vane assembly 26 centering at the first axis 28. With wind traveling in the direction of the turbine in the 9 o'clock to the 3 o'clock direction, wind will impinge the sail 128 of the guide vanes 36 at the 12 o'clock, 6 o'clock, 8 o'clock and 10 o'clock positions. In the use of a typical outer guide vane with a planar surface, the wind is likely to take the path of least resistance when impinging on the surface of the guide vanes 36 and be also dispersed away from the intended direction of flow towards the rotor blades 58. However in the case where the guide vanes 36 of the turbine system 20 are utilized, wind is collected and concentrated in and along the trough 136 and being redirected during exhaust from the vent 144 towards the leading edges of the rotor blades 58 proximal the respective guide vanes 36 at a particular instance.

The trough 136 also enables the build-up of air pressure therewithin to increase the mass flow rate of the air being exhausted from the vent 144. Further assistance is provided by the pair of flanges 172 at each of the first mast 160 and the second mast 162 to reduce spillover of air from the upper edge 156 and the lower edge 158 of the sail 128 which in turn mitigates pressure loss from the trough 136. Each of the rotor blades 58 is shaped to have a low pressure surface and a high pressure surface extending from the leading edge to the trailing edge thereof along its chord. When wind, or fluid, is directed at leading edge of the rotor blades 58 towards the trailing edge thereof, a low pressure zone is created along the low pressure surface which provides lift to the rotor blade 58.

Hence, an increase in the mass flow rate of air directed at the respective rotor blades 58 by the guide vane 36 at the 12 o'clock, 6 o'clock, 8 o'clock and 10 o'clock positions will generate lift at the respective rotor blades 58 which will in turn rotate the turbine assembly 24. Even at the 12 o'clock and 6 o'clock positions, the guide vanes 36 positioned thereat is able to redirect wind impinging the sail 128 perpendicular the rig plane 134 towards the turbine assembly 24 and the leading edge of proximal rotor blades 58. This increases the number of rotor blades 58 that can benefit from wind, or air, exhausted from the guide vanes 36.

The trough depth 140 of the trough 136 at the vent 144 is controllable to vary the outflow area at the vent 144. If the outflow area is too small for the inflow of air into the trough 136, the pressure build-up will restrict and hinder the outflow from the vent 144. However, if the trough depth 140 of the trough 136 at the vent 144 is too deep, the inner edge 142 of the sail 128 may collide with the rotor blades 58 displaced adjacent thereto. A further consideration is the exhaust angle 166a of the sail 128 at the region of the vent 144 which has to be configured with the vane angle 174 of the rig plane 134 with reference to the turbine assembly 24 and orientation of the rotor blades 58 to prevent stalling and to obtain the best possible lift coefficient. Further, adjustments to the vane angle 174 of each of the guide vanes 36 is to reduce overlap between adjacent guide vanes 36 in the direction of the wind.

As the wind travels across the respective rotor blades 58 from the guide vanes 36 at the 12 o'clock, 6 o'clock, 8 o'clock and 10 o'clock positions, the wind deflected and redirected by the inner vanes towards the rotor blades 58 between the 2 o'clock and 4 o'clock positions. The leading edges of the rotor blades 58 between the 2 o'clock and 4 o'clock positions are presented to the inner vanes to harvest remaining wind energy therefrom before the wind exits towards the guide vanes 36 at the 2 o'clock and 4 o'clock positions.

Variable Orientation Guide Vane Arrangement

In another implementation where the guide vane assembly 26 is rotationally displaceable about the first axis 28 relative the support structure 22, the guide vane assembly 26 can comprise two guide vanes 36 arranged, preferably, at equal angular spacing about the first axis 28. Based on the direction of the incoming wind being in the 9 o'clock towards the 3 o'clock in angular reference to the guide vane assembly 26 towards the first axis 28, the guide vane assembly 26 is displaceable about the first axis 28 to position the guide vanes 36 to outwardly extend from the outer frame 94 at approximately the 8 o'clock and 1 o'clock angular reference points on the guide vane assembly 26 centering at the first axis 28. Further, the guide vanes 36 are angled about the vane axis 135 to enable the wind direction to be substantially perpendicular the rig plane 134.

With the rotational direction of the turbine assembly 24 being in the clockwise direction about the first axis 28 when observed from a plan view thereof, the incoming wind will be caught by the rotor blades 58 in the contiguous 8 o'clock to 12 o'clock segment and the 12 o'clock to 1 o'clock segment for driving the rotor blades 58 in these segments in the clockwise direction about the first axis 28. This defines a first power phase for driving the turbine assembly 24 about the first axis 28. Airflow from the wind caught by the guide vane 36 extending from the 8 o'clock position will be directed across the rotor blades 58 substantially in the 7:30 o'clock to the 8 o'clock segment before being deflected and redirected by adjacent inner vanes direct wind air stream towards the rotor blades 58 in the 6:30 o'clock to the 7:30 o'clock segment. This defines a second power phase for driving the turbine assembly 24 about the first axis 28.

Airflow from the wind caught by the guide vane 36 extending from the 1 o'clock position will be directed across the rotor blades 58 substantially in the 1 o'clock to the 1:30 o'clock segment before being deflected and redirected by adjacent inner vanes direct wind air stream towards the rotor blades 58 in the 1:30 o'clock to the 2:30 o'clock segment. This defines a third power phase for driving the turbine assembly 24 about the first axis 28

The rig plane 134 of the guide vane 36 extending from each of the 1 o'clock and 8 o'clock positions are preferably at least perpendicular to or biased towards the direction of the wind. This will maximize exposure of the rotor blades 58 to the wind to maximize the number of the rotor blades 58 powering the turbine assembly 24, thereby resulting in the first, second and third power phases which will optimize capture of wind even in low wind speed situations. Further, the positioning and orientation of the guide vanes 36 can be varied to accommodate changes in wind direction.

Variable Orientation Support Structure

In some implementations, the support structure 22 sits on a circular guide rail to enable rotational displacement of the support structure 22 about the first axis 28. A latching array in signal communication with the controller may be operated to couple the guide vane assembly 26 to the support structure 22 to thereby prevent relative movement therebetween.

Based on the quantity of the guide vanes 36 employed and the inter-configuration of the guide vanes 36, a linear actuator, a hydraulic linkage mechanism or the like actuators may be employed for rotationally displacing and angularly positioning the support structure 22 about the first axis 28. Consequently, the guide vanes 36 are consequently rotationally displaceable and angularly positioned about the first axis 28. Based on usage requirements, the guide vane assembly 26 is decouplable from the support structure 22 to enable independent control of displacement and angular positioning of the support structure and the guide vane assembly 26.

Hence, in other implementations, the support structure 22 and the guide vane assembly 26 may be formed as a single unitary structure to reduce spatial footprint of the turbine system 20. This is akin to removably coupling the guide vane assembly 26 to the support structure 20 but with a reduction in complexity level of the structural and control components therewithin. However, forming the support structure 22 as a unitary structure with the guide vane assembly 26 will reduce the flexibility and extent of configuration therebetween.

Aspects of particular embodiments of the present disclosure address at least one aspect, problem, limitation, and/or disadvantage associated with existing wind turbine systems. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a person of ordinary skill in the art that several of the above-disclosed structures, components, or alternatives thereof, can be desirably combined into alternative structures, components, and/or applications. In addition, various modifications, alterations, and/or improvements may be made to various embodiments that are disclosed by a person of ordinary skill in the art within the scope of the present disclosure, which is limited only by the following claims.

The invention claimed is:

1. A turbine system comprising:
   a support structure defining a first axis and a central hollow coinciding with the first axis, the support structure having an outer portion and an inner portion forming the periphery of the central hollow, the support structure comprising a plurality of inner rolling elements arranged to define a plurality of inner pathways;
   a turbine assembly movably coupled to and configured to be supported from the inner portion of the support structure to enable rotational displacement thereof along the periphery of the central hollow and about the first axis, the turbine assembly comprising a plurality of inner guide rails; and
   a guide vane assembly coupled to the outer portion of the support structure for circumscribing the support structure, the guide vane assembly comprising a plurality of guide vanes positionable for guiding fluids impinging thereupon towards the turbine assembly to thereby rotationally displace the turbine assembly about the first axis,
   wherein each of the support structure and the turbine assembly has a tubular shape extending along the first axis between a first end and a second end with the turbine assembly being configured concentric the support structure;
   wherein each of the plurality of the inner pathways corresponds with one of the plurality of inner guide rails; and
   wherein the plurality of inner guide rails engages with the plurality of inner rolling elements to thereby movably couple the turbine assembly to the support structure and enable travel of each of the plurality of inner guide rails along the corresponding one of the plurality of inner pathways.

2. The turbine system as in claim 1, the plurality of inner guide rails being inter-coupled to form a rigid body and each of the plurality of inner rolling elements being one of a polymeric, an elastomeric and a metallic wheel being set with one of a bush and bearings on an axle coupled to the inner portion of the support structure.

3. The turbine system as in claim 1, the plurality of inner rolling elements being arranged for substantially impeding movement of each of the plurality of inner guide rails transverse the corresponding one of the plurality of pathways.

4. The turbine system as in claim 1, the turbine assembly comprising:
  upper inner guide rails comprising at least one of the plurality of inner guide rails being disposed towards the first end of the turbine assembly; and
  lower inner guide rails comprising at least one of the plurality of inner guide rails being disposed towards the second end of the turbine assembly.

5. The turbine system as in claim 4, further comprising:
  a linear alternator coupled to and configured to interpose the turbine assembly and the support structure, the linear alternator for generating power from relative displacement between the turbine assembly and the support structure.

6. The turbine system as in claim 4, the turbine assembly comprising:
  a plurality of rotor blades extending between the upper inner guide rails and the lower inner guide rails.

7. The turbine system as in claim 6, each of the plurality of rotor blades defining a rotor axis along the length thereof, the rotor axis of each of the plurality of rotor blades being substantially parallel the first axis.

8. The turbine system as in claim 7, each of the plurality of rotor blades being rotatably coupled to the upper inner guide rails and the lower inner guide rails to enable rotational displacement of each of the plurality of rotor blades about the rotor axis thereof.

9. The turbine system as in claim 8, further comprising:
  a plurality of rotor actuators in signal communication with a controller for controlling operation thereof, each of the plurality of rotor actuators in operational engagement with one of the lower inner guide rails and the upper inner guide rails and a corresponding one of the plurality of rotor blades for angularly positioning the corresponding one of the plurality of rotor blades about the rotor axis thereof.

10. The turbine system as in claim 1, the support structure comprising:
  an upper annular structure;
  a lower annular structure; and
  a plurality of pillars extending between and inter-coupling the upper annular structure and the lower annular structure,
  wherein at least one of the upper annular structure, the lower annular structure and the plurality of pillars being formed from truss structures.

11. The turbine system as in claim 1, the guide vane assembly comprising a plurality of outer guide rails, and the support structure comprising a plurality of outer rolling elements arranged to define a plurality of outer pathways, each corresponding with one of the plurality of outer guide rails,
wherein the plurality of outer guide rails engages with the plurality of outer rolling elements to thereby movably couple the guide vane assembly to the support structure and enable travel of each of the plurality of outer guide rails along the corresponding one of the plurality of outer pathways.

12. The turbine system as in claim 1, the guide vane assembly comprising:
  upper outer guide rails comprising at least one of the plurality of outer guide rails being disposed towards the first end of the support structure; and
  lower outer guide rails comprising at least one of the plurality of outer guide rails being disposed towards the second end of the support structure.

13. The turbine system as in claim 12, the guide vane assembly further comprising:
  an outer frame inter-coupling the plurality of outer guide rails and spatially displacing the upper outer guide rails from the lower outer guide rails and each of the plurality of outer rolling elements being one of a polymeric, an elastomeric and a metallic wheel being set with one of a bush and bearings on an axle coupled to the outer portion of the support structure.

14. The turbine system as in claim 13, the guide vane assembly comprising:
  an outer rack extending along an arcuate adjacent one of the upper outer guide rails and the lower outer guide rails, the outer rack being engageable with an outer actuator-driven one of a pinion and a worm gear to thereby enable control by the outer actuator for angular positioning of the guide vane assembly about the first axis.

15. The turbine system as in claim 13, the plurality of guide vanes being rotatably coupled to the outer frame and spatially distributed about the first axis, each of the plurality of guide vanes comprising:
  a rig structure having an inner portion and an outer portion forming extremities thereof, the rig structure defining a rig plane and a vane axis adjacent the inner portion thereof, the angle of the rig plane with the turbine assembly being variable about the vane axis, the inner portion being positioned nearer to the turbine assembly than the outer portion;
  a sail coupled to the rig structure and shaped for presenting a trough to a flow of impinging fluid, the trough having a depth defined from the rig plane, the sail extending from the outer portion towards the inner portion of the rig structure to terminate at an inner edge whereat a vent is defined, the fluid impinging on the sail being concentrated at the trough and redirected towards the turbine from the vent; and
  an actuator assembly coupled to the rig structure and whereto the portion of the sail at the vent is anchored, the actuator assembly being operable for positioning the inner edge of the sail one of towards and away from the rig plane for varying the depth of the trough at the vent.

16. The turbine system as in claim 15, the actuator assembly comprising a winch and a control line whereto the inner edge of the sail is coupled, the winch for one of taking and releasing slack in the control line to thereby displace the inner edge of the sail one of towards and away from the rig plane,
  wherein the sail being formed from a flexible material for enabling displacement of the trough across the rig plane by the impinging fluid.

17. The turbine system as in claim 15, the rig structure comprising:
- a post configured at the inner portion of the rig structure;
- a pair of booms extending from the post; and
- a pulley system and a pair of cross bars, each of the cross bars being configured substantially perpendicular one of the pair of booms with exteremities thereof being coupled to an actuator via the pulley system for controlling angular positioning of the pair of booms about the vane axis by the actuator.

18. The turbine system as in claim 17, the rig structure comprising an actuator and at least one of a pulley, a translational linkage and a plurality of gears interposing the actuator and the pair of boom for communicating displacement thereto about the vane axis.

19. The turbine system as in claim 17, the rig structure further comprising a plurality of stiffeners formed with the sail for shaping the trough, each of the plurality of stiffeners being elongated and spatially inter-displaced along a medial segment of the sail from the outer portion towards the inner portion of the rig structure with each of the plurality of stiffeners extending between the outer portion and the inner portion of the rig structure.

20. The turbine system as in claim 19, the plurality of stiffeners being disposed for defining folding lines parallel thereto, the sail being substantially kinked along the folding lines when presented to fluids impinging thereupon to thereby shape the trough of the sail.

21. The turbine system as in claim 18, each of the pair of boom having a mast coupled thereto, the sail being slidably coupled to the mast of each of the pair of boom for being slidably displaceable for collapsing towards the outer portion of the rig structure.

22. The turbine assembly as in claim 21, the rig structure further comprising a sheath formed along the outer portion thereof for receiving the sail when crumpled towards the outer portion of the rig structure and thereinto, the sheath being shaped and dimensioned for shielding the sail received therein from fluids directed thereat.

23. The turbine system as in claim 18, each of the pair of mast comprising a pair of flange extending therefrom oblique the rig plane to reduce escape of fluid from the trough theretowards.

* * * * *